United States Patent [19]

Münch et al.

[11] Patent Number: 5,194,183
[45] Date of Patent: Mar. 16, 1993

[54] THERMOCHROMIC EFFECT COATING

[75] Inventors: Jürgen Münch, Sachsenheim; Karl-Heinz Freese, Stuttgart; Carl W. Metzger, Denkendorf, all of Fed. Rep. of Germany

[73] Assignee: Akzo N.V., Arnhem, Netherlands

[21] Appl. No.: 399,634

[22] Filed: Aug. 28, 1989

[30] Foreign Application Priority Data

Sep. 9, 1988 [EP] European Pat. Off. ........ 88201966.4

[51] Int. Cl.$^5$ .......................... G02B 5/23; C09K 19/00; B32B 5/16
[52] U.S. Cl. ................ 252/586; 252/299.01; 428/1; 428/402.24
[58] Field of Search .......... 252/299.01, 586; 106/21; 503/213; 428/1, 379, 402.24

[56] References Cited

U.S. PATENT DOCUMENTS

| | | | |
|---|---|---|---|
| 2,800,457 | 7/1957 | Green et al. | 252/316 |
| 3,341,466 | 9/1967 | Brynko et al. | 252/316 |
| 3,620,889 | 6/1968 | Baltzer et al. | 161/8 |
| 3,697,297 | 10/1972 | Churchill et al. | 106/131 |
| 3,732,119 | 5/1972 | Churchill et al. | 117/1.7 |
| 4,301,054 | 11/1981 | Buirley et al. | 260/29.4 |
| 4,421,560 | 12/1983 | Kito et al. | 106/21 |
| 4,605,284 | 8/1986 | Fergason | 350/334 |
| 4,717,710 | 1/1988 | Shimizu et al. | 503/213 |
| 4,745,151 | 5/1988 | Noll et al. | 524/291 |
| 4,834,500 | 5/1989 | Hilsum et al. | 350/331 T |
| 4,851,282 | 7/1989 | Shimizu et al. | 428/1 |
| 4,952,033 | 8/1990 | Davis | 350/351 |
| 4,973,621 | 11/1990 | Buter | 524/460 |

FOREIGN PATENT DOCUMENTS

| | | |
|---|---|---|
| 0038127 | 10/1981 | European Pat. Off. . |
| 0228003 | 7/1987 | European Pat. Off. . |
| 242731 | 10/1987 | European Pat. Off. . |
| 0287144 | 10/1988 | European Pat. Off. . |
| 2201121 | 1/1972 | Fed. Rep. of Germany . |
| 2746228 | 10/1977 | Fed. Rep. of Germany . |
| 2461008 | 7/1979 | France . |
| 4001676 | 12/1970 | Japan . |
| 49035427 | 8/1972 | Japan . |
| 53-087986 | 8/1978 | Japan . |
| 54-080763 | 6/1979 | Japan . |
| 5377522 | 1/1980 | Japan . |
| 1211395 | 9/1986 | Japan . |
| WO91/13125 | 9/1991 | PCT Int'l Appl. . |
| 1305595 | 6/1970 | United Kingdom . |
| 1249432 | 10/1971 | United Kingdom . |

OTHER PUBLICATIONS

British Drug Houses Sales Literature, Publication date is unknown, Bloomroad, Poole, Dorset BH 12-4 NN, Great Britain.

Primary Examiner—Robert L. Stoll
Assistant Examiner—Shean C. Wu
Attorney, Agent, or Firm—James K. Poole; Louis A. Morris; Bart E. Lerman

[57] ABSTRACT

A thermochromic effect coating is provided which that it comprises an aqueous binder component including a flop effect pigment and an encapsulated thermochromic liquid crystal pigment. The particular combination in accordance with the present invention results in a coating with altered flop effect from the flop effect pigment as well as a more uniform color appearance from the liquid crystal pigment.

20 Claims, No Drawings

THERMOCHROMIC EFFECT COATING

BACKGROUND OF THE INVENTION

The present invention relates generally to aqueous coating compositions containing selected combinations of aqueous binders, flop effect pigments and encapsulated thermochromic liquid crystal pigments.

Flop effect pigments such as, for example, metallic aluminum or mica, produce an appearance condition within the coating wherein light is differentially reflected by the pigment. This can result in a varying color appearance based upon angle of viewing. For most effect pigments of this type, the flop is only a small matter of degree—a particular color flops to a lighter or darker shade. No major color change is normally exhibited.

Thermochromic liquid crystals are liquid crystals which react to changes in temperature by changing color. These liquid crystals generally comprise chiral nematic biphenyl compositions and ester derivatives of cholesterol and other sterols, which may be encapsulated by well-known techniques as exemplified by the disclosures of U.S. Pat. Nos. 2,800,457 and 3,341,466, both of which are incorporated by reference herein for all purposes. It has been found, however, that the use of these encapsulated thermochromic liquid crystals often results in a non-uniform color appearance.

It has now been surprisingly discovered that the combined use of the flop and encapsulated thermochromic liquid crystal effect pigments in certain aqueous binder systems results not only in an unexpected change in the color flop effect (a distinct color shift) but also in a more uniform color appearance from the liquid crystals.

SUMMARY OF THE INVENTION

In accordance with the present invention, there is provided a thermochromic effect coating comprising, in its overall concept, an aqueous binder component including a flop effect pigment and an encapsulated thermochromic liquid crystal pigment. These pigments may be added during the manufacture of the binder component or may be subsequently blended therein.

The so-produced thermochromic effect coating may be applied in any well-known manner onto a substrate, preferably dark in color, over which a clear topcoat should be applied for protection of the effect coating and liquid crystal pigment.

The thermochromic effect coating in accordance with the present invention, therefore, will display both the temperature variable color change of the encapsulated thermochromic liquid crystals and the flop from the flop effect pigments. As mentioned before, however, the color flop is unexpectedly shifted and the color appearance of the liquid crystal unexpectedly more uniform by the present combination.

These and other features of the present invention will be more readily understood by one skilled in the art from a reading of the following detailed description.

DETAILED DESCRIPTION OF THE PREFERRED EMBODIMENT

As previously mentioned, the thermochromic effect coatings of the present invention comprise an aqueous binder component including a flop effect pigment and an encapsulated thermochromic liquid crystal pigment.

The aqueous binder component comprises an aqueous dispersion binder. Suitable aqueous dispersion binders include at least one of an acrylic or polyurethane based aqueous dispersion resin, especially those suited for metallic effect coatings. See, for example, EP-A-38127, EP-A-228003 and EP-A-242731, all of which are hereby incorporated by reference.

Particularly preferred is an acrylic based aqueous dispersion resin of the type described in commonly owned EP-A-287144, which is incorporated by reference for all purposes. In there is disclosed an aqueous dispersion resin based upon a dispersion of an addition polymer, characterized in that the additional polymer is a polymer prepared in 2 or more steps by emulsion polymerization, and obtained by the copolymerization in a first step of 60-95 parts by weight (calculated on 100 parts by weight of the addition polymer) of a monomer mixture A consisting of 65-100 mole % of a mixture of 60-100 mole % of a (cylco)alkyl (meth)acrylate of which the (cyclo)alkyl group contains 4-12 carbon atoms, and 0-40 mole % of a di(cyclo)alkyl maleate and/or di(cyclo)alkyl fumarate of which the (cyclo)alkyl groups contain 4-12 carbon atoms, and 0-35 mole of a different copolymerizable, monoethylenically unsaturated monomer, and by copolymerization in a subsequent step of 5-40 parts by weight (calculated on 100 parts by weight of the addition polymer) of a monomer mixture B of 10-60 mole % of (meth)acrylic acid and 40-90 mole % of a different copolymerizable, monoethylenically unsaturated monomer, and with the carboxylic acid groups derived from the (meth)acrylic acid being at least partially ionized.

With these acrylic based aqueous dispersion resins, it is also preferred to utilize minor amounts of a polyurethane based aqueous dispersion resin to improve the pigment dispersing properties of the system. The polyurethane aqueous dispersion resin, when utilized, will generally comprise less than about 10% by weight of the aqueous binder component solids content. Suitable polyurethane based dispersion resins are well-known to those skilled in the art, as exemplified by the above-incorporated references.

The binder component may also optionally include minor amounts of other aqueous binders such as, for example, aqueous solution resins, as further described below.

Suitable flop effect pigment are selected from aluminum and mica pigments which are or can be made substantially stable in aqueous systems. Such pigments are well-known in the art and generally commercially available. The mica pigments are normally stable in aqueous systems, while the aluminum pigments can be stabilized by well-known treatments with various fatty acids and their esters. The aluminum and mica pigments may be utilized individually or in combination with one another.

Particularly preferred aluminum pigments comprise non-leafing, acid resistant, flaked aluminum particles, especially having a mean particle diameter of greater than about 20 μm. Commercially available examples of such aluminum pigments include Stapa Metallux 212 and Stapa Mobilux 181 from Eckart-Werke, as well as Al-Pate 7430NS from Alcan-Toyo. When utilized, it is preferred to add these aluminum pigments to the aqueous binder component in amounts ranging from 0.1 to 5.0, more preferably from 0.2 to 3.5. most preferably from 0.2 to 1.5, parts by weight aluminum pigment per 100 parts by weight of the aqueous binder component solids content.

Particularly preferred mica pigments comprise those coated with various metal oxides such as, for example, the metal oxides of chromium, titanium and iron, and especially those mica pigments having a mean particle diameter of greater than about 20 μm. A commercially available example of such mica pigments include Iriodin 9103 Sterling Silver WR from Merck GmbH. When utilized, it is preferred to add these mica pigments to the aqueous binder component in amounts ranging from 0.1 to 20.0. more preferably form 0.2 to 10.0, most preferably from 0.2 to 3.5. parts by weight mica pigment based upon 100 parts by weight of the aqueous binder component solids content.

Suitable encapsulated thermochromic liquid crystals comprise a wide variety of microencapsulated chiral nematic cholesteric, biphenyl and related based liquid crystals, generally of a particle diameter from about 5 μm to about 50 μm. Such microencapsulated liquid crystals are likewise well-known and generally commercially available. A particularly suitable commercially available example is Thermochromics TC 558, from BDH Ltd. It is preferred to add these liquid crystals to the aqueous binder component in amounts ranging from 5 to 150, more preferably from 25 to 125, most preferably from 60 to 90, parts by weight encapsulated liquid crystal based upon 100 parts by weight of the aqueous binder component solids content.

The flop effect pigment and encapsulated thermochromic liquid crystal pigment, as described above, may be added to the binder component by any well-known method such as, for example, by addition during the formation of the binder component or by simple blending into previously prepared components.

Minor amounts of other additives normally employed in the paint industry such as, for example, solvents applied in waterborne systems, other pigments, fillers, levelling agents, foam suppressing agents, rheology control agents, antioxidants and UV stabilizers, may be utilized in the thermochromic effect coatings of the present invention without unduly affecting the properties thereof.

For example, it is preferred to utilize minor amounts of an aqueous solution binder as part of the aqueous binder component to improve the film forming properties of the aqueous dispersion binder. The aqueous solution binder, when utilized, will generally comprise less than about 10% by weight of the aqueous binder component solids content. Suitable aqueous solution binders include well-known acrylic, polyester and/or polyurethane based solution resins.

The thermochromic effect coatings according to the present invention may be applied to a substrate in any desirable manner, such as by roller coating, spraying, brushing, sprinkling, flow coating, dipping, etc. Suitable substrates may be made, for example, of wood, metal and synthetic materials.

Curing of the thermochromic effect coating may be carried out at ambient temperature or, optionally, at elevated temperatures to reduce curing time. For instance, a coated substrate may be baked at higher temperatures in the range of 60° C. to 160° C. in a baking oven for a period of 10 to 60 minutes.

It is especially preferred that the thermoeffect coating be applied over a substrate which is dark or colored dark, preferably black, to obtain the maximum visual effects of the flop and thermochromic liquid crystal pigments. The substrate may be colored, dark, for example, by application to the substrate of a suitable dark colored primer.

A clear topcoat, especially containing a UV absorber, should be applied over the thermochromic effect coating to protect the coating from physical damage, to protect the liquid crystals from photodegradation and for better appearance characteristics (higher gloss, etc.). Although any number of well-known coatings normally utilized for clear topcoat applications is suitable, it is preferred to use normal 2-component solvent based topcoats, which seem to provide the best results.

The foregoing more general discussion of the invention will be further exemplified by the following specific examples and comparative examples offered by way of illustration and not limitation of the above-described invention.

EXAMPLES

Preparation of Aqueous Binder Component for Examples 1-2 and Comparative Examples 1-2

An aqueous dispersion resin was first prepared in accordance with the 3-step procedure detailed in Example 11 of EP-A-287144, previously incorporated by reference, except that the monomer mixture for step 1 comprised 7.2 mole % 2-hydroxyethyl methacrylate, 24.5 mole % n-butyl acrylate and 68.3 mole % butyl methacrylate; the monomer mixture for step 2 comprised 8.6 mole % acrylamide, 6.4 mole % 2-hydroxyethyl methacrylate, 22.5 mole % n-butyl acrylate and 62.5 mole % butyl methacrylate: and the monomer mixture for step 3 comprised 23.0 mole % methacrylic acid, 24.0 mole % 2-hydroxyethyl acrylate, 33.0 mole % n-butyl acrylate and 20.0 mole % methyl methacrylate. The resulting aqueous dispersion resin had a solids content of 23.4%.

To 52.5% by weight (weight % being based upon the total weight of the binder component) of this aqueous dispersion resin was added in the following order: 13.0% by weight demineralized water, 0.1% by weight dimethyl ethanolamine, 3.5% by weight butyl cellosolve, 7.6% by weight of Neorez R974 (a commercial polyurethane dispersion resin), 40.0% solids content, available from Polyvinyl Chemie), 13.0% by weight more demineralized water, 0.9% by weight of Alkydal F30W (a commercial polyester soluble resin available from Bayer AC), 5.9% by weight more butyl cellosolve, 2.7% by weight more demineralized water and 0.8% by weight of an 8% solution of Latekoll D (a commercial dispersion stabilizer available from BASF) in water.

The resulting aqueous binder component had a solids content of about 16.0%.

COMPARATIVE EXAMPLE 1

Thermochromic Coating (TC1)

A thermochromic coating was utilized comprising (a) 76.0% by weight of the above aqueous binder component and (b) 25.0% by weight of Thermochromics TC 558 (a commercial microencapsulated thermochromic liquid crystal, 33% solids content, available from BDH Ltd.) (about 70 parts by weight liquid crystal per 100 parts by weight binder solids content). The thermochromic coating was applied onto a Bonder 132 steel panel by spraying to a layer thickness of about 10 μm. The Bonder 132 steel panel had been precoated with Primer Black 03-59622, a commercial black primer available from Akzo Coatings GmbH. The thermochromic coating was predried for 10 minutes at 60° C., then a clearcoat (Autocryl MS. a commercial 2-component solvent based clearcoat available from Akzo Coatings GmbH) was applied over the thermochromic coating by spraying to a layer thickness of about 40 μm. predried for 30 minutes at 60° C., then dried for 7 days at room temperature.

COMPARATIVE EXAMPLE 2

Metallic Coating (MC1)

A metallic coating was utilized which comprised (a) 60.0% by weight of the aqueous binder component, (b) 0.8% by weight Paliogen red L3880 (a commercial red pigment available from BASF AG), (c) 2.0% by weight Metallux 212 (a commercial metallic aluminum pigment, 65% solids content, available from Eckart-Werke) (about 14 parts by weight aluminum pigment per 100 parts by weight binder solids), (d) 5.2% by weight butyl cellosolve and (e) 32.0% by weight demineralized water. The coating was applied onto a Bonder 132 steel panel by spraying to a layer thickness of about 25-30 μm. The Bonder 132 steel panel had been precoated with a black primer as in Comparative Example 1. The metallic coating was predried for 10 minutes at 60° C., then a clearcoat was applied as in Comparative Example 1.

EXAMPLE 1

Thermochromic Effect Coating (TEC1)

A thermochromic effect coating was utilized which comprised (a) 68.7% by weight of the aqueous binder component, (b) 25.0% by weight of Thermochromics TC558 (about 75 parts by weight liquid crystal per 100 parts binder solids), (c) 0.3% by weight Metallux 212 (about 1.8 parts by weight aluminum pigment per 100 parts by weight binder solids), (d) 1.0% by weight butyl cellosolve and (e) 5.0% by weight demineralized water. The coating was applied onto a Bonder 132 steel panel by spraying to a layer thickness of about 10-15 μm. The Bonder 132 steel panel had been precoated with a black primer as in Comparative Example 1. The thermochromic effect coating was predried for 10 minutes at 60° C., then a clearcoat was applied as in Comparative Example 1.

EXAMPLE 2

Thermochromic Effect Coating (TEC2)

A thermochromic effect coating was utilized which comprised (a) 68.5% by weight of the aqueous binder component, (b) 25.0% by weight of Thermochromics TC558 (about 75 parts by weight liquid crystal per 100 parts binder solids), (c) 0.5% by weight Metallux 212 (about 3.0 parts by weight aluminum pigment per 100 parts by weight binder solids), (d) 1.0% by weight butyl cellosolve and (e) 5.0% by weight demineralized water. The coating was applied onto a Bonder 132 steel panel by spraying to a layer thickness of about 10-15 μm. The Bonder 132 steel panel had been precoated with a black primer as in Comparative Example 1. The thermochromic effect coating was predried for 10 minutes at 60° C., then a clearcoat was applied as in Comparative Example 1.

Method of Visual Inspection of Coated Panels and Results

The panels coated as above were then visually inspected as to their appearance, color and effect. The viewing was carried out at a constant panel temperature of about 35° C.

The panels were first viewed in diffuse daylight, illuminated from the front of the observer, and judged for face tone (color appearance with panel held vertically in front of the observer's face). flop tone (color appearance with the panel held at approximately the same height but rotated to almost horizontal) and color change behavior during the transition (rotation) from face tone to flop tone. The results are presented in Table 1 below.

TABLE 1

| Example | Face Tone | Flop Tone | Transition |
|---------|-----------|-----------|------------|
| TC1 | red | green | instantaneous |
| MC1 | silver-red | red | instantaneous |
| TEC1 | silver-red-green | silver-blue-green | gradual |

An additional appraisal of the effect on the flop tone caused by the variation of the direction of illumination was also carried out. The results are presented below in Table 2.

TABLE 2

| Example | Rear light | Front light |
|---------|-----------|-------------|
| TC1 | red | green |
| MC1 | red | red |
| TEC1 | red-green | blue-green |
| TEC2 | green | blue |

The results presented in Table 1 illustrate the color flops of the systems. Both TC1 and MC1 behave in the expected manner—a very rapid flop occurs within a few degrees of radial movement (instantaneous). Unexpectedly, the combination of the flop and thermochromic pigments in accordance with the present invention (TEC1 and TEC2) produces a gradual color transition over a wide range of radial movement.

From Table 2, it is also apparent that the combination of the flop pigment and the thermochromic pigment in accordance with the present invention (TEC1 and TEC2) unexpectedly alters the optical properties of the system in that the original TC1 red (front light) and green (rear light) color is shifted towards green (front light) and blue (rear light). The normal combination of red pigment with the flop effect pigment (MC1) produces no such effect, the result being merely a red metallic appearance.

It should also be noted that in viewing the panels coated with TC1. the color effect from the thermochromic pigment was not uniform. The color effect from the thermochromic pigment on the panels coated with TEC1 and TEC2, however, was unexpectedly quite uniform.

Many modifications and variations can be made to the embodiments specifically mentioned herein without departing substantially from the concept of the present invention. Accordingly, it should be clearly understood that the preferred form of the invention described herein is exemplary only, and is not intended as a limitation on the scope thereof.

We claim:

1. A thermochromic effect coating composition comprising an aqueous binder component including a flop effect pigment and an encapsulated thermochromic liquid crystal pigment, said aqueous binder component comprising an aqueous dispersion binder.

2. The thermochromic effect coating composition of claim 1, wherein said aqueous dispersion binder comprises at least one of an acrylic or polyurethane based aqueous dispersion resin.

3. The thermochromic effect coating composition of claim 1, wherein said flop effect pigment is selected from aluminum and mica pigments.

4. The thermochromic effect coating composition of claim 3, wherein said aqueous binder component includes from 0.1 to 5 parts by weight aluminum pigment per 100 parts by weight aqueous binder component solids content.

5. The thermochromic effect coating composition of claim 3, wherein said aqueous binder component includes from 0.1 to 20 parts by weight mica pigment per 100 parts by weight aqueous binder component solids content.

6. The thermochromic effect coating composition of claim 1, wherein said aqueous binder component includes from 5 to 150 parts by weight encapsulated thermochromic liquid crystal per 100 parts by weight aqueous binder component solids content.

7. The thermochromic effect coating composition of claim 1, wherein said encapsulated thermochromic liquid crystal pigment comprises a microencapsulated chiral nematic liquid crystal.

8. A substrate coated with a thermochromic effect coating, wherein the thermochromic effect coating comprises an aqueous binder component including a flop effect pigment and an encapsulated thermochromic liquid crystal pigment, said aqueous binder component comprising an aqueous dispersion binder.

9. The coated substrate of claim 8, wherein said substrate is dark colored.

10. The coated substrate of claim 8, wherein said substrate is further coated with a clear topcoat applied over said thermochromic effect coating.

11. The coated substrate of claim 10, wherein said clear topcoat comprises a 2-component solvent based clear topcoat.

12. The coated substrate of claim 8, wherein said aqueous dispersion binder comprises at least one of an acrylic or polyurethane based aqueous dispersion resin.

13. The coated substrate of claim 8, wherein said flop effect pigment is selected from aluminum and mica pigments.

14. The coated substrate of claim 13, wherein said aqueous binder component includes from 0.1 to 5 parts by weight aluminum pigment per 100 parts by weight aqueous binder component solids content.

15. The coated substrate of claim 13, wherein said aqueous binder component includes from 0.1 to 20 parts by weight mica pigment per 100 parts by weight aqueous binder component solids content.

16. The coated substrate of claim 8, wherein said aqueous binder component includes from 5 to 150 parts by weight encapsulated thermochromic liquid crystal per 100 parts by weight aqueous binder component solids content.

17. The coated substrate of claim 8, wherein said encapsulated thermochromic liquid crystal pigment comprises a microencapsulated chiral nematic liquid crystal.

18. The thermochromic effect coating composition of claim 5 wherein said mica pigment comprises mica particles coated with at least one metal oxide.

19. A thermochromic effect coating composition comprising an aqueous binder component comprising
  (1) at least one aqueous dispersion binder selected from acrylic and polyurethane-based dispersion resins;
  (2) a flop effect pigment selected from aluminum and mica pigments; and
  (3) an encapsulated thermochromic liquid crystal pigment.

20. The thermochromic effect coating composition of claim 19 wherein said liquid crystal pigment comprises at least one microencapsulated chiral nematic liquid crystal.

* * * * *

UNITED STATES PATENT AND TRADEMARK OFFICE
CERTIFICATE OF CORRECTION

PATENT NO. : 5,194,183
DATED : March 16, 1993
INVENTOR(S) : MUNCH, J. et al.

It is certified that error appears in the above—identified patent and that said Letters Patent is hereby corrected as shown below:

Column 3, line 10, please change "form" to --from--.

Signed and Sealed this

Fifteenth Day of February, 1994

Attest:

BRUCE LEHMAN

*Attesting Officer*  *Commissioner of Patents and Trademarks*